(12) United States Patent
Courter et al.

(10) Patent No.: US 11,048,518 B2
(45) Date of Patent: Jun. 29, 2021

(54) SYNCHRONOUS OPERATION OF PERIPHERAL DEVICES

(71) Applicant: The Boeing Company, Chicago, IL (US)

(72) Inventors: Brandon M. Courter, Mt. Pleasant, SC (US); Anthony W. Baker, Gilbertsville, PA (US); Brigette T. Cochran, Madison, WI (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/584,559

(22) Filed: Sep. 26, 2019

(65) Prior Publication Data

US 2021/0096870 A1 Apr. 1, 2021

(51) Int. Cl.
| | |
|---|---|
| *H04N 5/225* | (2006.01) |
| *G06F 9/38* | (2018.01) |
| *H04N 5/247* | (2006.01) |
| *H04N 5/238* | (2006.01) |
| *H04N 5/235* | (2006.01) |
| *H04N 5/232* | (2006.01) |

(52) U.S. Cl.
CPC ........... *G06F 9/3836* (2013.01); *H04N 5/232* (2013.01); *H04N 5/238* (2013.01); *H04N 5/2353* (2013.01); *H04N 5/247* (2013.01)

(58) Field of Classification Search
CPC .............................................. H04N 5/232061
See application file for complete search history.

(56) References Cited

U.S. PATENT DOCUMENTS

| | | | | |
|---|---|---|---|---|
| 2003/0071912 A1* | 4/2003 | Minakuti | ........... | H04N 1/00896 348/372 |
| 2003/0210329 A1* | 11/2003 | Aagaard | ............ | H04N 5/23296 348/159 |
| 2006/0171603 A1* | 8/2006 | Jung | .................. | H04N 1/00148 382/254 |
| 2007/0223901 A1* | 9/2007 | Fujimoto | ........... | H04N 1/00347 396/56 |
| 2007/0274705 A1* | 11/2007 | Kashiwa | ................ | H04N 5/232 396/310 |
| 2008/0225121 A1* | 9/2008 | Yoshida | ................. | H04N 5/247 348/159 |

(Continued)

*Primary Examiner* — Twyler L Haskins
*Assistant Examiner* — Dwight Alex C Tejano
(74) *Attorney, Agent, or Firm* — Kunzler Bean & Adamson/Boeing

(57) ABSTRACT

Disclosed herein is an apparatus that comprises an instruction receiving module configured to receive, at a master device, a set of instructions for operating a plurality of peripheral devices. The apparatus also comprises an instruction identification module configured to identify at least one subset of the set of instructions that are associated with at least one slave device. The apparatus further comprises an instruction distribution module configured to send the at least one subset of instructions to the at least one slave device. The apparatus additionally comprises a trigger module configured to send a start signal, from the master device to the at least one slave device, that triggers the at least one slave device to begin executing the at least one subset of instructions such that each of the plurality of peripheral devices operates synchronously based on the executing instructions.

20 Claims, 5 Drawing Sheets

(56) References Cited

U.S. PATENT DOCUMENTS

| | | | | |
|---|---|---|---|---|
| 2010/0157020 A1* | 6/2010 | Choi | .................... | H04N 9/8227 348/47 |
| 2011/0157389 A1* | 6/2011 | McClellan | ....... | H04N 5/232061 348/222.1 |
| 2012/0200723 A1* | 8/2012 | Yano | ...................... | G03B 15/05 348/211.2 |
| 2016/0065849 A1* | 3/2016 | Homma | ........... | H04N 5/232061 348/36 |

* cited by examiner

SYNCHRONOUS OPERATION OF PERIPHERAL DEVICES

FIELD

This disclosure relates generally to peripheral devices, and more particularly to synchronously operating a plurality of peripheral devices.

BACKGROUND

Certain applications utilize synchronous operation of peripheral devices such as simultaneously capturing a plurality of images using multiple cameras that are instructed to fire at the same time. However, existing solutions may require carefully planned advanced configuration, which is time consuming and may delay the synchronous operation of the peripheral devices, which can lead to errors in the output that the peripheral devices generate.

SUMMARY

The subject matter of the present application has been developed in response to the present state of the art, and in particular, in response to the problems and disadvantages associated with conventional methods for synchronous operation of peripheral devices. Accordingly, the subject matter of the present application has been developed to synchronously operate peripheral devices that overcomes at least some of the above-discussed shortcomings of prior art techniques.

Disclosed herein is an apparatus that comprises an instruction receiving module configured to receive, at a master device, a set of instructions for operating a plurality of peripheral devices. The apparatus also comprises an instruction identification module configured to identify at least one subset of the set of instructions that are associated with at least one slave device that is communicatively coupled to the plurality of peripheral devices. The at least one subset of instructions is executable on the associated at least one slave device according to a predefined trigger sequence to generate a series of activity on the plurality of peripheral devices. The apparatus further comprises an instruction distribution module configured to send, from the master device, the at least one subset of instructions to the at least one slave device associated with the at least one subset of instructions. The apparatus additionally comprises a trigger module configured to send a start signal from the master device to the at least one slave device. The start signal triggers the at least one slave device to begin executing the at least one subset of instructions according to the predefined trigger sequence such that each of the plurality of peripheral devices operates synchronously based on the executing instructions. The preceding subject matter of this paragraph characterizes example 1 of the present disclosure.

The apparatus further comprises an initiation module configured to receive an initiation signal from a host device. The initiation signal triggers the trigger module to send the start signal to the at least one slave device. The preceding subject matter of this paragraph characterizes example 2 of the present disclosure, wherein example 2 also includes the subject matter according to example 1, above.

The initiation module receives the initiation signal from the host device in response to sending a ready signal to the host device. The ready signal is sent in response to the at least one slave device being configured with the at least one subset of instructions. The preceding subject matter of this paragraph characterizes example 3 of the present disclosure, wherein example 3 also includes the subject matter according to example 2, above.

The apparatus further comprises a plurality of slave devices that are each communicatively coupled to at least one peripheral device and communicatively coupled to the master device in parallel such that each of the plurality of slave devices receives the start signal at the same time. The preceding subject matter of this paragraph characterizes example 4 of the present disclosure, wherein example 4 also includes the subject matter according to any one of examples 1-3, above.

The plurality of peripheral devices comprises a plurality of cameras such that multiple images can be captured simultaneously in response to the at least one slave device communicatively coupled to the plurality of cameras executing an instruction according to the predefined trigger sequence for capturing an image at the same time. The preceding subject matter of this paragraph characterizes example 5 of the present disclosure, wherein example 5 also includes the subject matter according to any one of examples 1-4, above.

The instruction for each of the plurality of cameras comprises settings information for configuring each of the plurality of cameras. The settings information comprises one or more of aperture settings, ISO settings, and shutter speed settings. The preceding subject matter of this paragraph characterizes example 6 of the present disclosure, wherein example 6 also includes the subject matter according to example 5, above.

The plurality of peripheral devices comprises a projector configured to display an image in response to the at least one slave device communicatively coupled to the projector executing an instruction according to the predefined trigger sequence to display the image on the projector. The instruction comprises data defining the image that the projector displays. The preceding subject matter of this paragraph characterizes example 7 of the present disclosure, wherein example 7 also includes the subject matter according to any one of examples 1-6, above.

The plurality of peripheral devices comprises a sensor configured to capture environment data in response to the at least one slave device communicatively coupled to the sensor executing an instruction according to the predefined trigger sequence to capture environment data from the sensor. The preceding subject matter of this paragraph characterizes example 8 of the present disclosure, wherein example 8 also includes the subject matter according to any one of examples 1-7, above.

The apparatus further comprises an instruction processing module configured to parse the set of instructions to identify the at least one subset of instructions for the at least one slave device. The preceding subject matter of this paragraph characterizes example 9 of the present disclosure, wherein example 9 also includes the subject matter according to any one of examples 1-8, above.

An instruction of the set of instructions includes one or more of a peripheral device identifier, a slave device identifier, a port identifier for the port that the peripheral device is communicatively coupled to on the at least one slave device, configuration settings for the peripheral device, and timing information defining a time interval for triggering the peripheral device. The preceding subject matter of this paragraph characterizes example 10 of the present disclosure, wherein example 10 also includes the subject matter according to any one of examples 1-9, above.

The instruction receiving module is configured to receive a new set of instructions for activating the plurality of peripheral devices from a host device in response to sending a notification to the host device that the at least one slave device has executed the at least one subset of instructions. The preceding subject matter of this paragraph characterizes example 11 of the present disclosure, wherein example 11 also includes the subject matter according to any one of examples 1-10, above.

Further disclosed herein a system that comprises a host device and a master device communicatively coupled to the host device. The system further comprises at least one slave device communicatively coupled to the master device. The system additionally comprises a plurality of peripheral devices communicatively coupled to the at least one slave device. The system also comprises an apparatus that comprises an instruction receiving module configured to receive, at the master device, a set of instructions for operating the plurality of peripheral devices. The apparatus also comprises an instruction identification module configured to identify at least one subset of the set of instructions that are associated with the at least one slave device that is communicatively coupled to the plurality of peripheral devices. The at least one subset of instructions is executable on the associated at least one slave device according to a predefined trigger sequence to generate a series of activity on the plurality of peripheral devices. The apparatus further comprises an instruction distribution module configured to send, from the master device, the at least one subset of instructions to the at least one slave device associated with the at least one subset of instructions. The apparatus additionally comprises a trigger module configured to send a start signal from the master device to the at least one slave device. The start signal triggers the at least one slave device to begin executing the at least one subset of instructions according to the predefined trigger sequence such that each of the plurality of peripheral devices operates synchronously based on the executing instructions. The preceding subject matter of this paragraph characterizes example 12 of the present disclosure.

The system further comprises one or more input processing devices communicatively coupled to the plurality of peripheral devices for receiving and processing data that the plurality of peripheral devices capture. The preceding subject matter of this paragraph characterizes example 13 of the present disclosure, wherein example 13 also includes the subject matter according to example 12, above.

The master device and the at least one slave device comprise programmable hardware devices that include real-time clocks. The preceding subject matter of this paragraph characterizes example 14 of the present disclosure, wherein example 14 also includes the subject matter according to any one of examples 12-13, above.

The master device and the at least one slave device are encapsulated within the same enclosure. The preceding subject matter of this paragraph characterizes example 15 of the present disclosure, wherein example 15 also includes the subject matter according to any one of examples 12-14, above.

The apparatus further comprises an initiation module configured to receive an initiation signal from the host device. The initiation signal triggers the trigger module to send the start signal to the at least one slave device. The preceding subject matter of this paragraph characterizes example 16 of the present disclosure, wherein example 16 also includes the subject matter according to any one of examples 12-15, above.

The system further comprises a plurality of slave devices that are each communicatively coupled to at least one peripheral device and communicatively coupled to the master device in parallel such that each of the plurality of slave devices receives the start signal at the same time. The preceding subject matter of this paragraph characterizes example 17 of the present disclosure, wherein example 17 also includes the subject matter according to any one of examples 12-16, above.

The host device stores a configuration file comprising connection information for each of the peripheral devices and the at least one slave device to which the peripheral devices are communicatively connected. The preceding subject matter of this paragraph characterizes example 18 of the present disclosure, wherein example 18 also includes the subject matter according to any one of examples 12-17, above.

The connection information comprises, for each peripheral device, one or more of a port identifier for a port on a slave device that the peripheral device is connected to, an identifier for the slave device, an identifier for the peripheral device, and a port of the slave device that is connected to the master device. The preceding subject matter of this paragraph characterizes example 19 of the present disclosure, wherein example 19 also includes the subject matter according to example 18, above.

Additionally disclosed herein is a method that comprises receiving, at a master device, a set of instructions for operating a plurality of peripheral devices. The method also comprises identifying at least one subset of the set of instructions that are associated with at least one slave device that is communicatively coupled to the plurality of peripheral devices. The at least one subset of instructions is executable on the associated at least one slave device according to a predefined trigger sequence to generate a series of activity on the plurality of peripheral devices. The method further comprises sending, from the master device, the at least one subset of instructions to the at least one slave device associated with the at least one subset of instructions. The method additionally comprises sending a start signal from the master device to the at least one slave device. The start signal triggers the at least one slave device to begin executing the at least one subset of instructions according to the predefined trigger sequence such that each of the plurality of peripheral devices operates synchronously based on the executing instructions. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
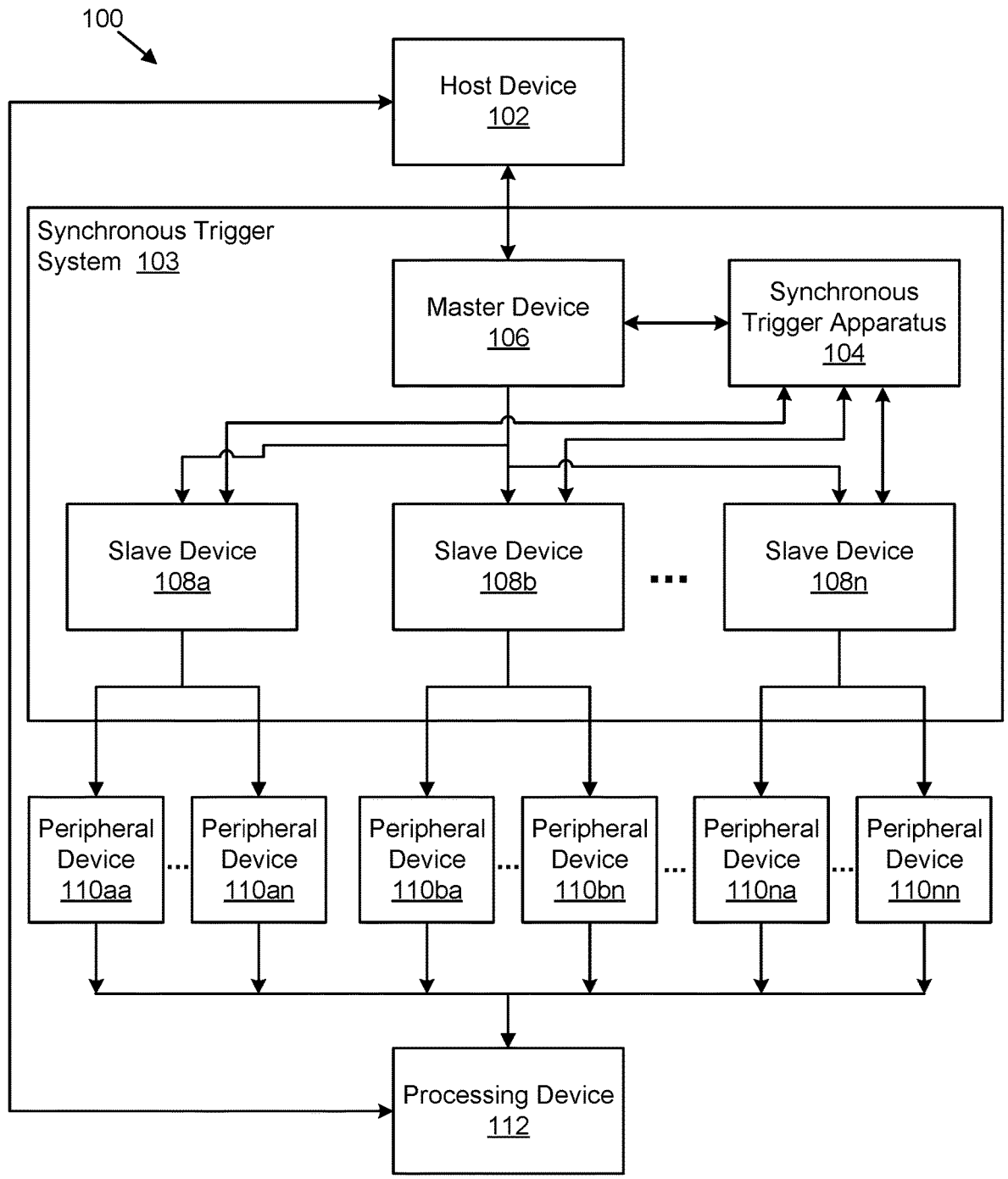
FIG. 1 is a schematic block diagram of a system for synchronous operation of peripheral devices, according to one or more examples of the present disclosure.

FIG. 1 is a schematic block diagram of a system 100 for synchronous operation of peripheral devices. In one embodiment, the system 100 includes an instance of a host device 102. The host device 102 may be embodied as a computing device such as a desktop computer, a server, a laptop computer, a tablet computer, a smart phone, a smart television, a field programmable gate array ("FPGA"), an application-specific integrated circuit ("ASIC"), a microcontroller, and or other device that include a processor for executing program code, instructions, functions, and/or the like.

In one embodiment, the system 100 includes a synchronous trigger system 103. The synchronous trigger system 103 is configured to organize the synchronous firing of the peripheral devices 110aa-nn (collectively 110) using a master device 106 and one or more slave devices 108a-n (collectively 108). In one embodiment, the master device 106 is embodied as a microcontroller such as a single-board microcontroller with a real-time clock ("RTC") chip (e.g., an Arduino® or Raspberry Pi® device), an FPGA, an ASIC, or other computing device that includes an RTC chip, unit, component, or module. The host device 102 is communicatively coupled to the synchronous trigger system 103 via the master device 106 of the synchronous trigger system 103 to provide instructions to the master device 106 for configuring the slave devices 108 to control the peripheral devices 110. The connection between the host device 102 and the master device 106 may include a physical communication bus such as a serial bus (a universal serial bus ("USB") connection), a wireless communication channel (e.g., Bluetooth®), and/or the like.

The slave devices 108, similar to the master device 106, are embodied as microcontrollers such as a single-board microcontroller with an RTC chip (e.g., an Arduino® or Raspberry Pi® device), FPGAs, ASICs, or other computing devices that include an RTC chip, unit, component, or module. The slave devices 108 are communicatively coupled to the peripheral devices 110 via a physical communication bus such as a serial bus, e.g., a USB connection, a wireless connection, or the like. In certain embodiments, the slave devices 108 are communicatively coupled to the master device in parallel such that each of the plurality of slave devices 108 can receive signals, communications, or the like at the same time such as a start signal described below.

In certain embodiments, the master device 106 and the one or more slave devices 108 are enclosed within the same case, box, container, and/or the like that provides input and output ports for connecting to a host device 102, peripheral devices 110, and/or the like (e.g., a network attached storage device, a networking device, or the like), e.g., via a USB connection, a wireless connection, or the like.

The peripheral devices 110 include external devices that the slave devices 108 can configure and control via a communication bus. Examples of peripheral devices 110 include cameras, sensors (e.g., sensors configured for capturing environment data such as light sensors, oxygen sensors, moisture sensors, weather sensors, and/or the like), projectors, lights, and/or the like. The peripheral devices 110 are communicatively coupled to a processing device 112, which is embodied as a desktop computer, a server, a laptop computer, a tablet computer, a smart phone, a smart television, a field programmable gate array ("FPGA"), an application-specific integrated circuit ("ASIC"), a microcontroller, and or other device.

The processing device 112 is communicatively coupled to the peripheral devices 110 to receive output, if any, that the peripheral devices 110 generate (e.g., images, sensor data, or the like). In some embodiments, the processing device 112 is the same device as the host device 102. In other embodiments, the processing device 112 is separate from the host device 102 but may be communicatively coupled to the host device 102 to send and/or receive data. For example, the processing device 112 may send the output from the peripheral devices 110 to the host device 102 so that the host device 102 can confirm whether the output is valid output or not (e.g., is the expected output or is valid data).

In one embodiment, the synchronous trigger apparatus 104 is communicatively coupled to, is located on, or is otherwise part of the master device 106 and/or the slave devices 108. The synchronous trigger apparatus 104 is configured to receive instructions at the master device 106 from the host device 102 for synchronously operating the peripheral devices 110. The synchronous trigger apparatus 104 identifies subsets of the instructions that are associated with slave devices 108 and executable on the slave devices

108 according to a predefined trigger sequence to generate a series of activity on the peripheral devices 110.

The synchronous trigger apparatus 104 distributes the subsets of instructions to the slave devices 108 and sends a start signal from the master device 106 to the slave devices 108 to trigger execution of the instructions at each slave device 108 such that each of the plurality of peripheral devices 110 operates synchronously. In this manner, a plurality of peripheral devices 110 can be synchronously operated, controlled, activated, or the like with minimal user input, configuration, or interaction.

Figure 2:
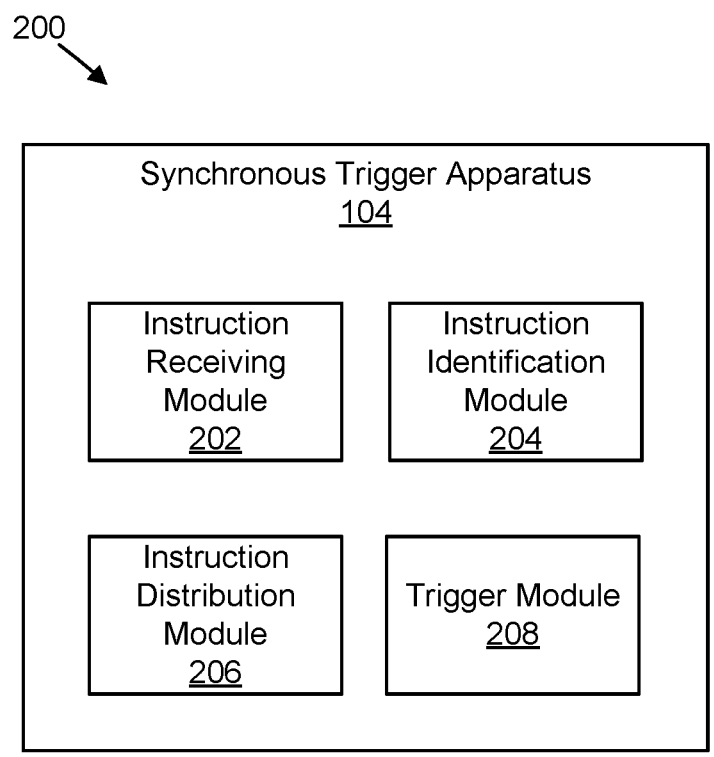
FIG. 2 is a schematic block diagram of an apparatus for synchronous operation of peripheral devices, according to one or more examples of the present disclosure.

FIG. 2 is a schematic block diagram of an apparatus 200 for synchronous operation of peripheral devices. In one embodiment, the apparatus 200 includes an instance of a synchronous trigger apparatus 104. The synchronous trigger apparatus 104 includes an instruction receiving module 202, an instruction identification module 204, an instruction distribution module 206, and a trigger module 208, which are described in more detail below.

The instruction receiving module 202 is configured to receive, at the master device 106, a set of instructions for operating a plurality of peripheral devices 110. The instructions include steps, functions, signals, port numbers for ports on the slave device 108, pin identifiers for pins on the slave devices 108, slave device and/or peripheral device identifiers, flags, variables, values, and/or the like that a slave device 108 uses to control, activate, operate, trigger, configured, or the like activity on one or more peripheral devices 110 that are connected to the slave device 108.

For example, the instructions may include steps for turning certain pins high/low or activating/deactivating certain ports of a slave device 108 at a specified time, e.g., a real-time clock time, a processor clock time, clock cycle, clock frequency, clock pulse or the like. The instructions may be received from the host device 102 in a particular format such as a JavaScript Object Notation ("JSON") format, an eXtensible Markup Language ("XML") format, and/or other structured format.

The instructions may include an identifier for a peripheral device 110 (e.g., an identifier such as a unique ID, a serial number, or the like for the peripheral device 110 that the instruction is for), an identifier for a slave device 108 (e.g., an identifier such as a unique ID, a serial number, or the like for the slave device 108 that the instruction is for), a port identifier for the port that the peripheral device 110 is communicatively coupled to on a slave device 108, timing information defining a time interval for triggering the peripheral device 110 (e.g., the predefined trigger sequence) and/or a timing for the duration for triggering the peripheral device 110, and/or the like.

In some embodiments, the instructions include configuration data or settings for a slave device 108 and/or a peripheral device 110. The configuration data may include settings for a peripheral device 110. For example, where a peripheral device 110 is a camera, the configuration data may include data for configuring the aperture settings, ISO settings, and/or shutter speed settings for the camera prior to the camera taking an image. Accordingly, the instructions at the slave device 108 may include instructions for configuring the peripheral device 110 with the configuration settings. The instructions may include other data such as image data to be displayed on a projector, sensor configuration data for setting a sensitivity or other settings of a sensor, light configuration data for setting a brightness, color, or duration of a light, and/or the like.

In one embodiment, the instructions are defined and stored on the host device 102. For example, a user may define the instructions based on his knowledge of the peripheral devices 110 (e.g., the time it takes for a camera to capture and process an image or to change camera settings, the time it takes for a projector to warm up or change images, the time it takes to turn on a light, the time it takes to capture and process sensor data, or the like) and the desired outcome. The host device 102 may convert the user's instructions to a format or language that is interpretable by the master device 106 and/or the slave devices 108.

The instruction identification module 204 is configured to identify at least one subset of the set of instructions that are associated with at least one slave device 108 that is communicatively coupled to the plurality of peripheral devices 110. The at least one subset of instructions are executable on the associated at least one slave device 108 according to the predefined trigger sequence to generate a series of activity on the plurality of peripheral devices 110.

The predefined trigger sequence, as used herein, defines or specifies an order and timing for executing the sequence of instructions at a slave device 108. For example, the predefined trigger sequence may define, for each slave device 108, at what time, clock cycle, clock pulse, or the like (based on the clocks of the slave devices 108 executing each of the subsets of instructions) to send a signal to a peripheral device 110, to change the state of a pin or send data on a port connected to a peripheral device 110, to wait, to configure a peripheral device 110, and/or the like.

The predefined trigger sequence accounts for durations of actions that the peripheral devices 110 perform such as a warming-up time period, time to turn on, time to capture data (e.g., an image, sensor data, etc.), and/or the like. In this manner, instructions are not performed before the peripheral devices 110 are ready to perform the action that the instruction requires. For instance, it may take 500 ms to capture and process an image on a camera before the camera is ready to take another picture. The instructions may include an instruction for a slave device 108 to wait for 500 ms between instructions or commands to capture images with the camera in order to account for the camera's processing time. The instructions for a slave device 108 also account for other peripheral devices 110 connected to different slave devices 108. For instance, an instruction may command a slave device 108 to wait thirty seconds before executing the next instruction because a different slave device 108 executed an instruction to turn on a projector that takes at least twenty-five seconds to warm up.

The instruction identification module 204 may process the instructions to identify markers, flags, or other identifiers that indicate one or more instructions that are associated with a particular slave device 108 and/or peripheral device 110 connected to a slave device 108. In certain embodiments, explained in more detail below, the instruction processing module 304 parses the instructions to determine which instructions are associated with a slave device 108 and/or a peripheral device 110 and inserts the markers, flags, or other identifiers in the instructions to indicate the subsets of the instructions for the slave devices 108.

The instruction distribution module 206 is configured to send, from the master device 106, the at least one subset of instructions to the at least one slave device 108 associated with the at least one subset of instructions. The instruction distribution module 206, for instance, may send the instructions to the slave devices 108 over a communication bus as one instruction at a time, as a set of instructions, and/or the like, while maintaining the order and the predefined trigger sequence of the instructions.

The trigger module 208 is configured to send a start signal from the master device 106 to the at least one slave device 108. The start signal triggers the at least one slave device 108 to begin executing the at least one subset of instructions according to the predefined trigger sequence such that each of the plurality of peripheral devices 110 operates synchronously based on the executing instructions.

For instance, the trigger module 208 may send a signal, message, notification, or the like on each of the communication buses that are coupled to the slave devices 108 to trigger the slave devices 108 to begin executing their instruction sets according to the predefined trigger sequence. In this manner, the slave devices 108 act synchronously, e.g., on the same clock cycle, in response to receiving the trigger signal from the master device 106, which allows the peripheral devices 110 to operate synchronously and simultaneously.

In one example embodiment, the peripheral devices 110 may include a projector and a plurality of cameras that are used for metrology. The slave device 108 connected to the projector may execute an instruction to present an image using the projector and then the slave devices 108 connected to the plurality of cameras may execute instructions that cause the cameras to capture images of the image that the projector presents. Because each subset of instructions that each slave device 108 executes has a predefined trigger sequence that is in sync with the other subsets of instructions for each slave device 108, in this example, the projector may present a series of images that the plurality of cameras capture with built-in delays to account for the projector changing images, for the cameras capturing and processing the images, and/or the like. Thus, after the slave devices 108 receive their subsets of instructions, the master device 106 sends a trigger signal to tell each of the slave devices 108 to begin executing their instructions until all of the instructions for each slave device 108 have been completed.

For example, if a slave device 108 is connected to two cameras, the instructions for the slave device 108 may include a predefined trigger sequence that includes time intervals (e.g., pause intervals) to account for the time to turn on the projector, the time for turning the cameras on, time to capture and process an image, time for changing settings of the cameras, and/or the like. For example, at time t=0, an instruction set may instruct a first slave device 108a to turn a projector on (e.g., activate pin X or send an "on" signal on port Y) and at the same time t=0 a different instruction set may instruct a second slave device 108b to turn both cameras on (e.g., activate pins A and B or send an "on" signal on ports C and D, or the like). The next instructions for each of the slave devices 108a, 108b may be to wait time t=30 for the projector to warm up. On the first slave device 108a, at time t=31, the next instruction may be to display an image on the projector for 2 seconds/clock cycles/clock pulses (e.g., send image data to the projector on port Y) while at time t=31 the next instruction on the second slave device 108b may be to wait one second/clock cycle/clock pulse for the image to be displayed by the projector.

At time t=32, the first slave device 108a continues to display the image using the projector while the instructions for the second slave device 108b at time t=32 is to send a signal to the cameras (e.g., an image capture signal on ports C and D) to capture images of the image that the projector displays using both cameras simultaneously. On the first slave device 108a, at time t=33, the next instruction may be to display a different image using the projector for 2 seconds/clock cycles/clock pulses while at time t=33 the next instruction on the second slave device 108b may be to wait one second/clock cycle/clock pulse for the image to change. At time t=34, the first slave device 108a continues to display the image on the projector while the instructions for the second slave device 108b at time t=34 is to send a signal to the cameras to capture images of the image that the projector displays using both cameras, and so on until all of the instructions for each of the slave devices 108 are executed. Thus, the predefined trigger sequence defines the timing and order of the instructions for each slave device 108 such that each slave device 108, when it receives a trigger signal from the master device 110, executes their set of instructions in the order and according to the time of the predefined trigger sequence.

Once all the instructions are completed, the instruction receiving module 202 is configured to send a notification to the host device 102 that the instructions are completed and receives a new set of instructions for activating the plurality peripheral devices 110 in response to sending the notification. The host device 102 may queue sets of instructions to automatically send to the master device 106 in response to receiving the notification that the slave devices 108 have completely executed their instructions.

Figure 3:
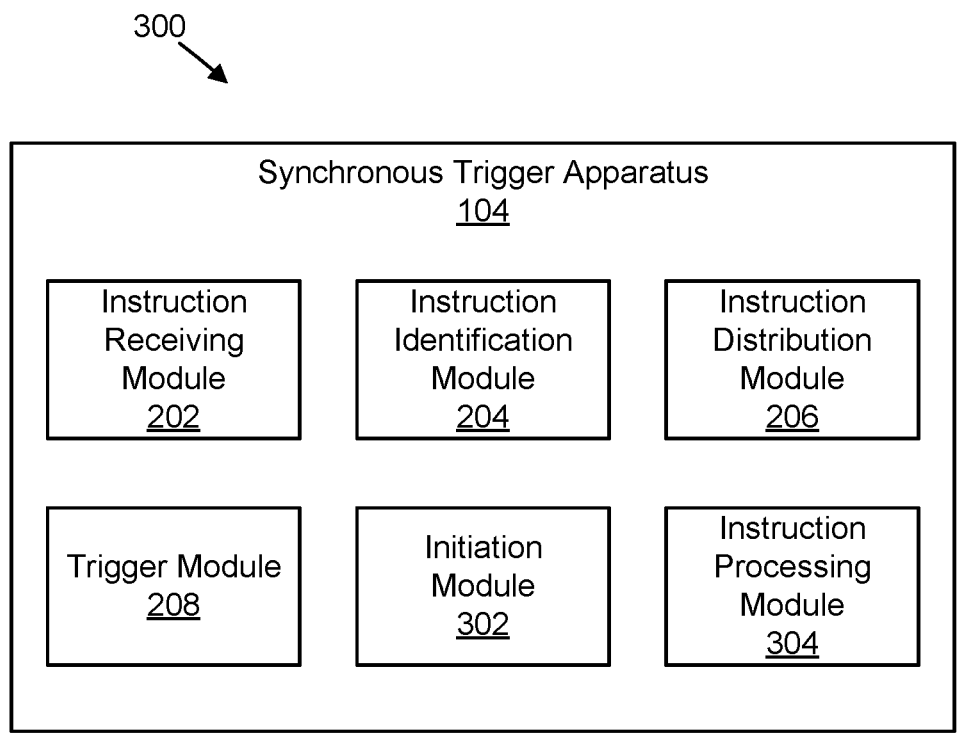
FIG. 3 is a schematic block diagram of another apparatus for synchronous operation of peripheral devices, according to one or more examples of the present disclosure.

FIG. 3 is a schematic block diagram of another apparatus 300 for synchronous operation of peripheral devices. In one embodiment, the apparatus includes an instance of a synchronous trigger apparatus 104. The synchronous trigger apparatus 104 includes an instruction receiving module 202, an instruction identification module 204, an instruction distribution module 206, and a trigger module 208, which may be substantially similar to the instruction receiving module 202, the instruction identification module 204, the instruction distribution module 206, and the trigger module 208 described above with reference to FIG. 2. In further embodiments, the synchronous trigger apparatus 104 includes an initiation module 302 and an instruction processing module 304, which are described in more detail below.

The initiation module 302 is configured to receive an initiation signal from the host device 102. The initiation signal from the host device 102 triggers the trigger module 208 to send the start signal to the slave devices 108 and trigger the slave devices 108 to execute their instructions that the instruction distribution module 206 sent to the slave devices 108.

In one embodiment, the initiation module 302 receives the initiation signal from the host device 102 in response to sending a ready signal to the host device 102. For example, after the instruction distribution module 206 distributes the subsets of instructions to the slave devices 108 and the slave devices 108 are configured to execute the instructions (e.g., the slave devices 108 have set variables, located and determined the status of pins/ports, prepared the peripheral devices 110 for operation, and/or the like), the initiation module 302 and/or the instruction distribution module 206 may send a signal to the host device 102 to indicate that the slave devices 108 and/or the peripheral devices 110 are ready for operation.

In certain embodiments, the host device 102 sends an initiation signal automatically after a period of time (e.g., one second, five seconds, a minute, or the like) after the instructions are sent to the master device 106 to reduce the communications between the master device 106 and the host device 102. In certain embodiments, the host device 102 sends an initiation signal in response to user input, e.g., an administrator manually sending the initiation signal.

The instruction processing module 304 is configured to parse, analyze, process, or the like the set of instructions to identify the at least one subset of instructions for the slave devices 108. The instruction processing module 304, for instance, may use regular expressions or other string processing methods to locate identifiers for slave devices 108 and/or peripheral devices 110 that are connected to slave devices 108 to identify the corresponding instructions that should be executed by the slave devices 108. The instruction processing module 304 may insert flags, markers, indicators, or other identifiers in the instructions to indicate to the instruction identification module 204 which instructions are assigned to which slave devices 108.

The instruction processing module 304, in one embodiment, verifies that the instructions are formatted in a language that is understandable, readable, and/or the like by the slave devices 108. For instance, the instruction identification module 204 may determine the versions of hardware/firmware for the slave devices 108 and may confirm that the instructions are formatted for the particular versions of hardware/firmware and may convert the instructions to a format that is compatible with the particular versions of hardware/firmware for the slave devices 108. The instruction identification module 204, in one embodiment, converts the instructions into a series of commands for the slave devices 108 that indicate at what time, e.g., on which clock pulses, clock cycles, or the like to fire or trigger a signal on a particular pin, port, or the like and for what duration.

Figure 4:
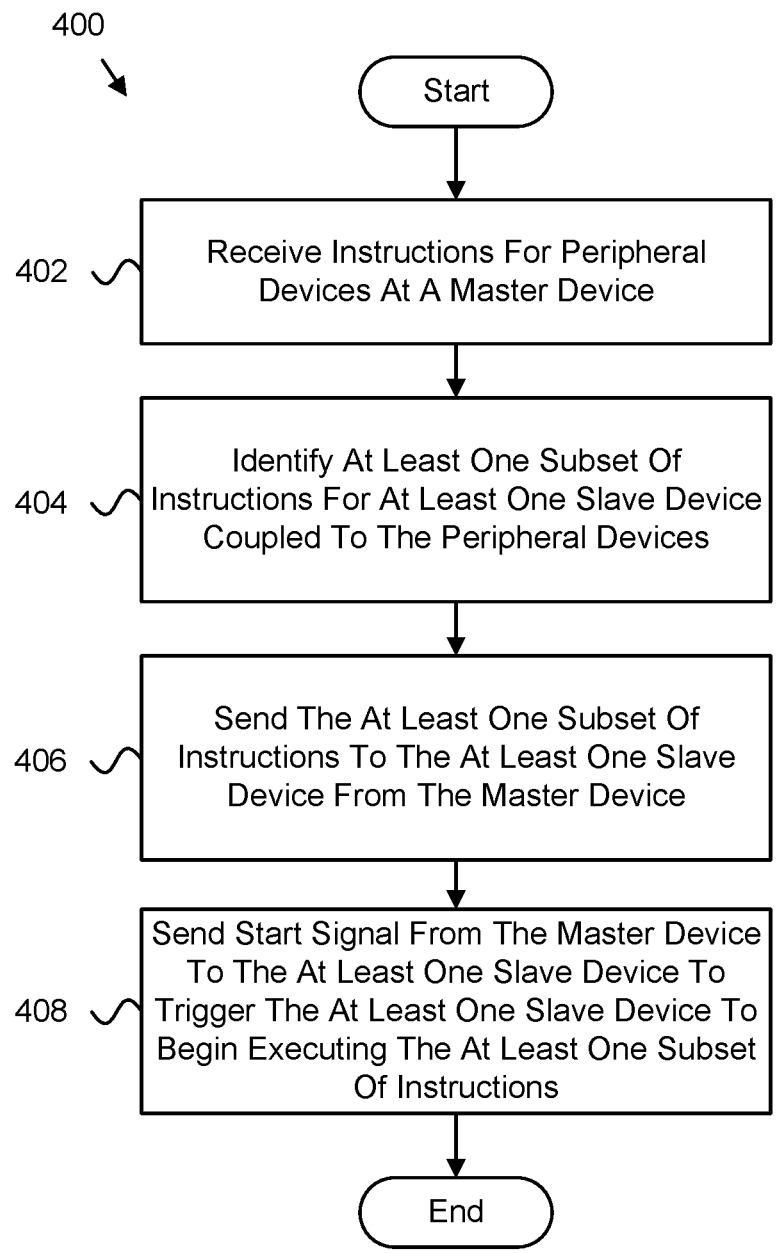
FIG. 4 is a schematic flow diagram of a method for synchronous operation of peripheral devices, according to one or more examples of the present disclosure.

FIG. 4 is a schematic flow diagram of a method 400 for synchronous operation of peripheral devices. In one embodiment, the method 400 begins and receives 402, at a master device 106, a set of instructions for operating a plurality of peripheral devices 110. In further embodiments, the method 400 identifies 404 at least one subset of the set of instructions that are associated with at least one slave device 108 that is communicatively coupled to the plurality of peripheral devices 110. The at least one subset of instructions are executable on the associated at least one slave device 108 according to a predefined trigger sequence to generate a series of activity on the plurality of peripheral devices 110.

In further embodiments, the method 400 sends 406, from the master device 106, the at least one subset of instructions to the at least one slave device 108 associated with the at least one subset of instructions. In some embodiments, the method 400 sends 408 a start signal from the master device 106 to the at least one slave device 108. The start signal triggers the at least one slave device 108 to begin executing the at least one subset of instructions according to the predefined trigger sequence such that each of the plurality of peripheral devices 110 operates synchronously based on the executing instructions, and the method 400 ends. In one embodiment, the instruction receiving module 202, the instruction identification module 204, the instruction distribution module 206, and the trigger module 208 perform the various steps of the method 400.

Figure 5:
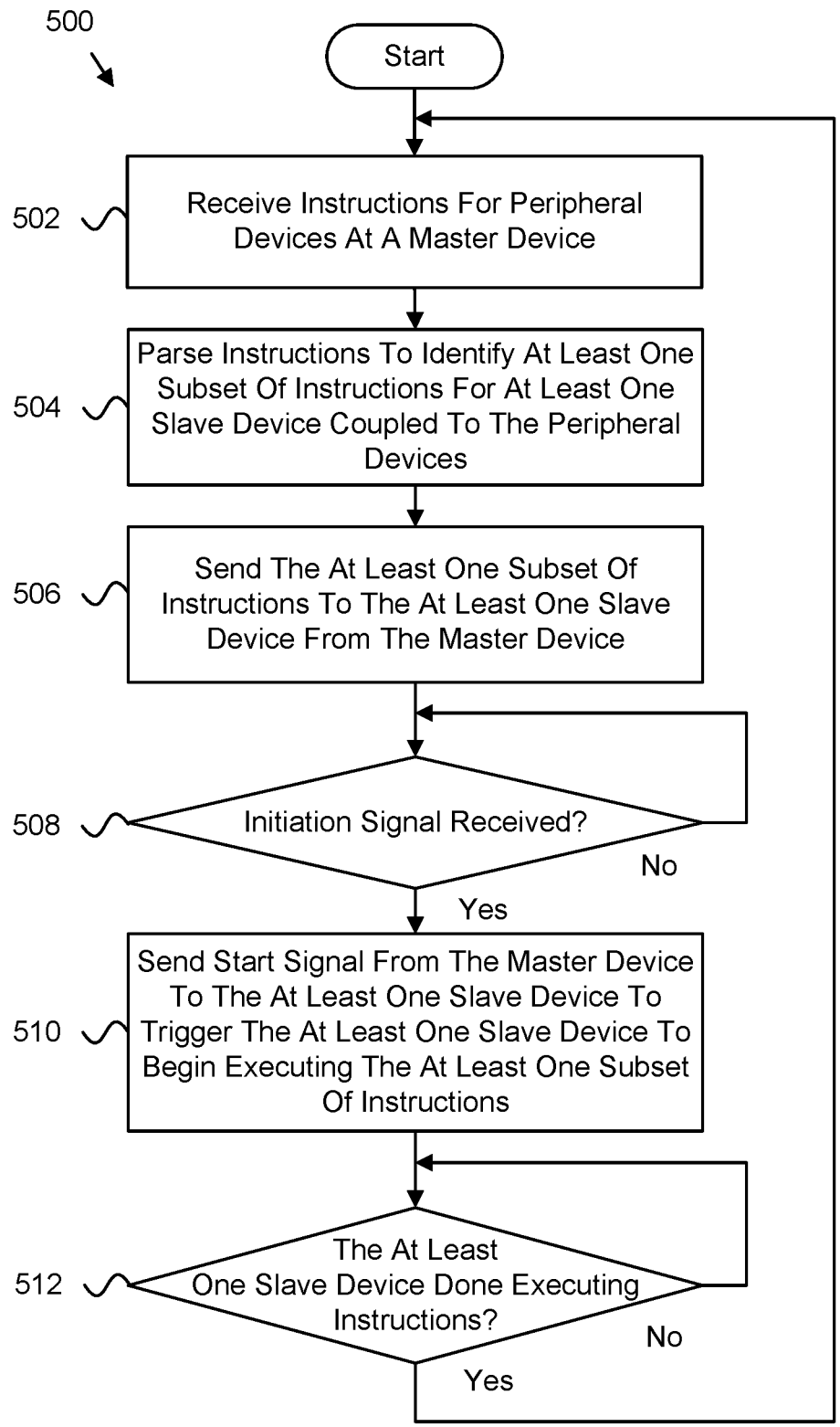
FIG. 5 is a schematic flow diagram of a method for synchronous operation of peripheral devices, according to one or more examples of the present disclosure.

FIG. 5 is a schematic flow diagram of a method 500 for synchronous operation of peripheral devices. In one embodiment, the method 500 begins and receives 502, at a master device 106, a set of instructions for operating a plurality of peripheral devices 110. In various embodiments, the method 500 parses 504 the set of instructions to identify the at least one subset of instructions for the at least one slave device 108. In some embodiments, the method 500 sends 506, from the master device 106, the at least one subset of instructions to the at least one slave device 108 associated with the at least one subset of instructions.

In certain embodiments, the method 500 determines 508 whether an initiation signal is received at the master device 106 from the host device 102. If not, the method 500 continues to monitor for the initiation signal. Otherwise, the method 500 sends 510 a start signal from the master device 106 to the at least one slave device 108 to trigger the at least one slave device 108 to begin executing the at least one subset of instructions according to the predefined trigger sequence such that each of the plurality of peripheral devices 110 operates synchronously based on the executing instructions. The method 500, in further embodiments, determines 512 whether the slave devices 108 have completed executing their instructions. If not, the method 500 continues to monitor for completion of the instructions; otherwise, the method 500 receives 502 a new set of instructions from the host device for execution. In one embodiment, the instruction receiving module 202, the instruction identification module 204, the instruction distribution module 206, the trigger module 208, the initiation module 302, and the instruction processing module 304 perform the various steps of the method 500.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus, comprising:
an instruction receiving module configured to receive, at a master device, a set of instructions for operating a plurality of peripheral devices;
an instruction identification module configured to identify at least one subset of the set of instructions that are associated with at least one slave device that is communicatively coupled to the plurality of peripheral devices, the at least one subset of instructions executable on the associated at least one slave device according to a predefined trigger sequence to generate a series of activity on the plurality of peripheral devices;
an instruction distribution module configured to send, from the master device, the at least one subset of instructions to the at least one slave device associated with the at least one subset of instructions; and
a trigger module configured to send a start signal from the master device to the at least one slave device, the start signal triggering the at least one slave device to begin executing the at least one subset of instructions according to the predefined trigger sequence such that each of the plurality of peripheral devices operates synchronously based on the at least one subset of instructions;
wherein the instruction receiving module is configured to receive a new set of instructions for activating the plurality of peripheral devices from a host device in response to sending a notification to the host device that the at least one slave device has executed the at least one subset of instructions.

2. The apparatus of claim 1, further comprising an initiation module configured to receive an initiation signal from a host device, the initiation signal triggering the trigger module to send the start signal to the at least one slave device.

3. The apparatus of claim 2, wherein the initiation module receives the initiation signal from the host device in response to sending a ready signal to the host device, the ready signal sent in response to the at least one slave device being configured with the at least one subset of instructions.

4. The apparatus of claim 1, further comprising a plurality of slave devices that are each communicatively coupled to at least one peripheral device and communicatively coupled to the master device in parallel such that each of the plurality of slave devices receives the start signal at the same time.

5. The apparatus of claim 1, wherein the plurality of peripheral devices comprises a plurality of cameras such that multiple images can be captured simultaneously in response to the at least one slave device communicatively coupled to the plurality of cameras executing an instruction according to the predefined trigger sequence for capturing an image at the same time.

6. The apparatus of claim 5, wherein the instruction for each of the plurality of cameras comprises settings information for configuring each of the plurality of cameras, the settings information comprising one or more of aperture settings, ISO settings, and shutter speed settings.

7. The apparatus of claim 1, wherein the plurality of peripheral devices comprises a projector configured to display an image in response to the at least one slave device communicatively coupled to the projector executing an instruction according to the predefined trigger sequence to display the image on the projector, the instruction comprising data defining the image that the projector displays.

8. The apparatus of claim 1, wherein the plurality of peripheral devices comprises a sensor configured to capture environment data in response to the at least one slave device communicatively coupled to the sensor executing an instruction according to the predefined trigger sequence to capture environment data from the sensor.

9. The apparatus of claim 1, further comprising an instruction processing module configured to parse the set of instructions to identify the at least one subset of instructions for the at least one slave device.

10. The apparatus of claim 1, wherein an instruction of the set of instructions includes one or more of a peripheral device identifier, a slave device identifier, a port identifier for the port that the peripheral device is communicatively coupled to on the at least one slave device, configuration settings for the peripheral device, and timing information defining a time interval for triggering the peripheral device.

11. A system, comprising:
a host device;
a master device communicatively coupled to the host device;
at least one slave device communicatively coupled to the master device;
a plurality of peripheral devices communicatively coupled to the at least one slave device; and
an apparatus, comprising:
an instruction receiving module configured to receive, at the master device, a set of instructions for operating the plurality of peripheral devices;
an instruction identification module configured to identify at least one subset of the set of instructions that are associated with the at least one slave device that is communicatively coupled to the plurality of peripheral devices, the at least one subset of instructions executable on the associated at least one slave device according to a predefined trigger sequence to generate a series of activity on the plurality of peripheral devices;
an instruction distribution module configured to send, from the master device, the at least one subset of instructions to the at least one slave device associated with the at least one subset of instructions; and
a trigger module configured to send a start signal from the master device to the at least one slave device, the start signal triggering the at least one slave device to begin executing the at least one subset of instructions according to the predefined trigger sequence such that each of the plurality of peripheral devices operates synchronously based on the at least one subset of instructions;
wherein the instruction receiving module is configured to receive a new set of instructions for activating the plurality of peripheral devices from a host device in response to sending a notification to the host device that the at least one slave device has executed the at least one subset of instructions.

12. The system of claim 11, wherein:
the apparatus further comprises an initiation module configured to receive an initiation signal from a host device, the initiation signal triggering the trigger module to send the start signal to the at least one slave device; and
the initiation module receives the initiation signal from the host device in response to sending a ready signal to the host device, the ready signal sent in response to the at least one slave device being configured with the at least one subset of instructions.

13. The system of claim 11, further comprising one or more input processing devices communicatively coupled to the plurality of peripheral devices for receiving and processing data that the plurality of peripheral devices capture.

14. The system of claim 11, wherein the master device and the at least one slave device comprise programmable hardware devices that include real-time clocks.

15. The system of claim 11, wherein the master device and the at least one slave device are encapsulated within the same enclosure.

16. The system of claim 11, wherein the apparatus further comprises an initiation module configured to receive an initiation signal from the host device, the initiation signal triggering the trigger module to send the start signal to the at least one slave device.

17. The system of claim 11, further comprising a plurality of slave devices that are each communicatively coupled to at least one peripheral device and communicatively coupled to the master device in parallel such that each of the plurality of slave devices receives the start signal at the same time.

18. The system of claim 11, wherein the host device stores a configuration file comprising connection information for each of the peripheral devices and the at least one slave device to which the peripheral devices are communicatively connected.

19. The system of claim 18, wherein the connection information comprises, for each peripheral device, one or more of a port identifier for a port on a slave device that the peripheral device is connected to, an identifier for the slave device, an identifier for the peripheral device, and a port of the slave device that is connected to the master device.

20. A method, comprising:
receiving, at a master device, a set of instructions for operating a plurality of peripheral devices;
identifying at least one subset of the set of instructions that are associated with at least one slave device that is communicatively coupled to the plurality of peripheral devices, the at least one subset of instructions executable on the associated at least one slave device according to a predefined trigger sequence to generate a series of activity on the plurality of peripheral devices;
sending, from the master device, the at least one subset of instructions to the at least one slave device associated with the at least one subset of instructions;
sending a start signal from the master device to the at least one slave device, the start signal triggering the at least one slave device to begin executing the at least one subset of instructions according to the predefined trigger sequence such that each of the plurality of peripheral devices operates synchronously based on the executing instructions;
sending a notification that the at least one slave device has executed the at least one subset of instructions; and
receiving, at the master device, a new set of instructions for operating the plurality of peripheral devices in response to sending the notification.

* * * * *